July 16, 1946.   R. C. POLLOCK   2,404,089
DISPLAY DEVICE
Filed March 30, 1940    4 Sheets-Sheet 1

INVENTOR

July 16, 1946.   R. C. POLLOCK   2,404,089
DISPLAY DEVICE
Filed March 30, 1940   4 Sheets-Sheet 2
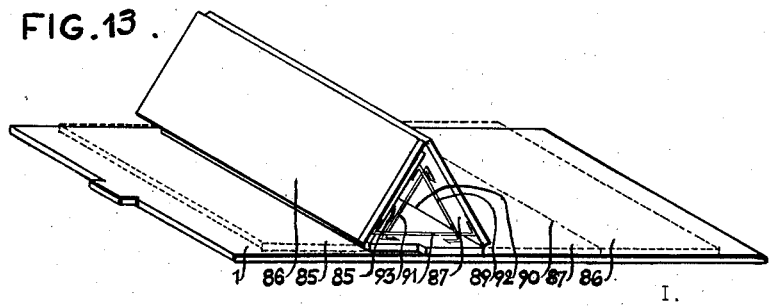
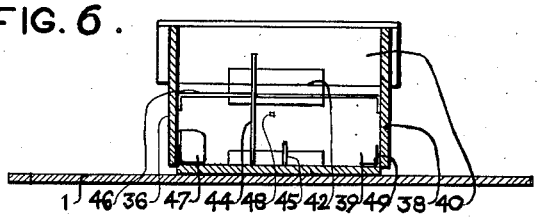
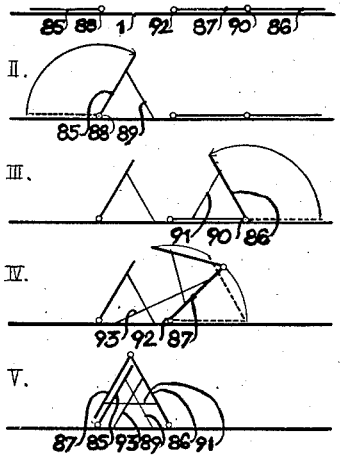
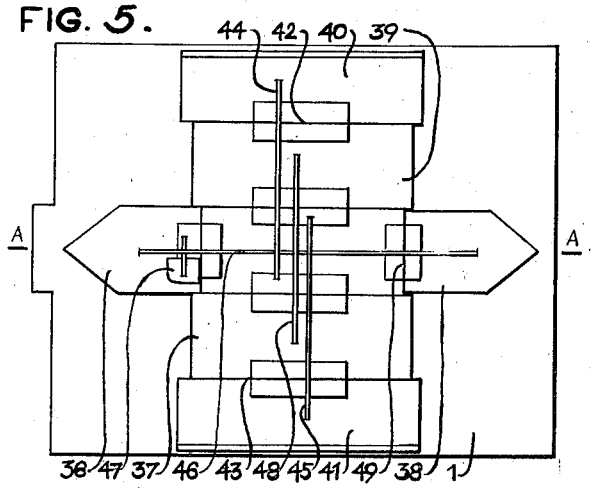
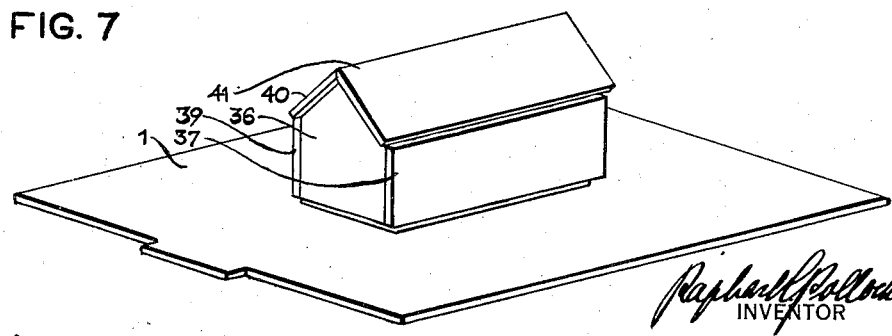
INVENTOR
BY
ATTORNEY July 16, 1946.  R. C. POLLOCK  2,404,089
DISPLAY DEVICE
Filed March 30, 1940  4 Sheets-Sheet 3
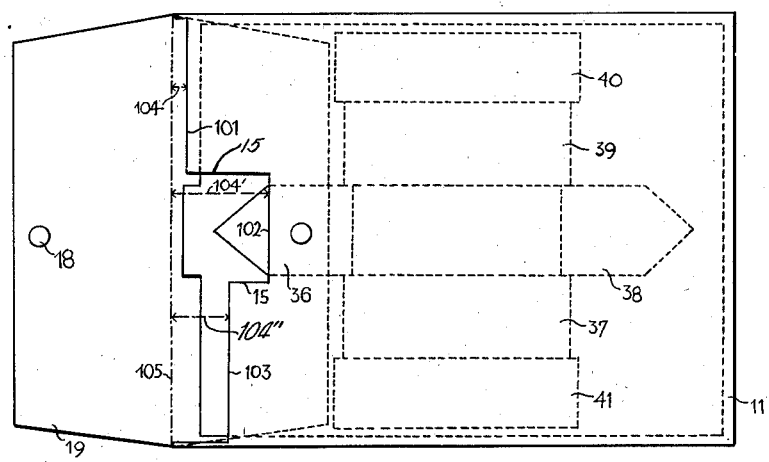
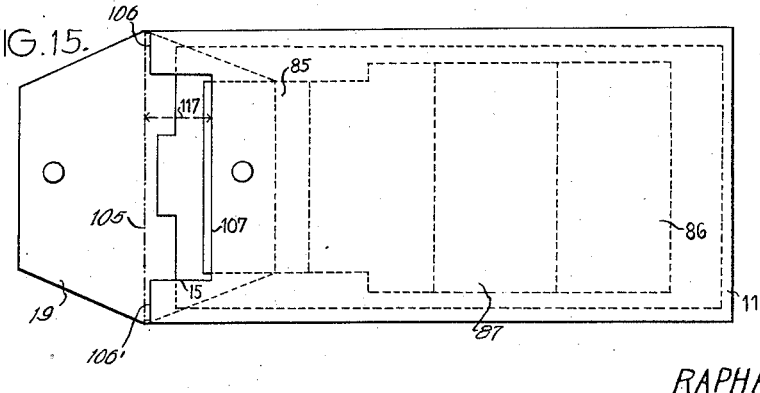
Inventor
RAPHAEL C. POLLOCK July 16, 1946.  R. C. POLLOCK  2,404,089
DISPLAY DEVICE
Filed March 30, 1940  4 Sheets-Sheet 4

Inventor
RAPHAEL C. POLLOCK
By Geo Poffen

Patented July 16, 1946

2,404,089

UNITED STATES PATENT OFFICE 2,404,089

DISPLAY DEVICE

Raphael C. Pollock, New York, N. Y.

Application March 30, 1940, Serial No. 326,885

6 Claims. (Cl. 40—126)

This invention relates to display devices and especially to that kind of displaying mechanisms which are used in two different positions. In one of these positions—corresponding to the display position proper—the object is shown and displayed to greatest advantage. The other position requires folding of all parts so as to form an entirely flat package of a thickness not exceeding that of a certain number of sheets. The second position is required for mailing, shipping, and other transport needs.

In devices of the type specified the folded parts of the display device are automatically brought into their final display position when an envelope or other device in which they are housed is removed and for this purpose the parts are mounted on a base and are attached to tensile parts, such as elastic bands, ribbons, strings in such a way that they can be moved from the folded position to a display position.

It is an object of the invention to build up complex or aggregate display arrangements, consisting of many independently propelled units and components. It is a further object to build up the structure to be displayed in a predetermined order or sequence before the eyes of the user withdrawing the device from the envelope. Such predetermined sequence may be used to obtain coordination of the operation of the units or of the parts forming them during the building up of a structure of a complex nature in which certain parts have to stand first or have first to move to their display position in order to actuate or to release the propelling means of other units or to arrest the movement of other units propelled by independent means in a predetermined position, or to obtain some timing effect such as the illustration of a tale, the parts building themselves up in accordance with the sequence of the events therein, or to render the display more effective by dramatizing a picture, or to build up slogans consisting of several parts or words forming a slogan in the proper order.

Another object of the invention consists in removing certain defects associated with the use of elastic bands or ribbons which will cause a frequent failure to operate and which are due to the fact that the folding of the parts eliminates the lever arm which the point of attachment to the base and the point of attachment to the part to be lifted must still preserve to be immediately operative upon withdrawal from the envelope.

In connection with some of the purposes mentioned, the invention also comprises means to display several parts, printed words or pictures etc. one after the other practically on the same spot, so that one display is wholly or partly covered up by the following display.

Further objects of my invention will be gathered from the following specification in which reference is made to the accompanying drawings:

In the drawings:

Fig. 1 showing a vertical section of the device when displayed, Fig. 2 showing a similar section through the device when almost folded and inserted into an envelope, and Fig. 3 showing a perspective view of the device in displayed condition.

Figs. 5, 6, 7, 8 show another object which builds itself up before the spectator by arranging its parts in proper position on the base, Fig. 5 being a view from above on the parts in folded position, Fig. 6 showing a vertical section through the house according to line A—A of Fig. 5, Fig. 7 shows a perspective view of the house in display position, and Fig. 8 shows the envelope used. The device enclosed in the envelope is shown in dotted lines.

Figure 9:
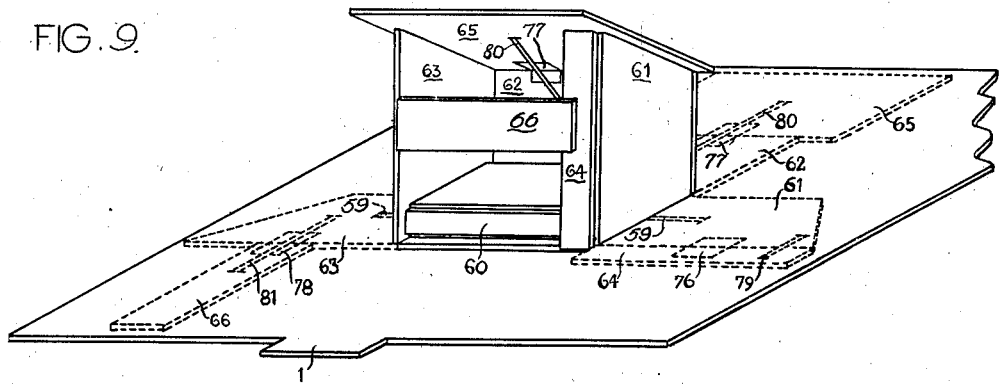
Figure 10:
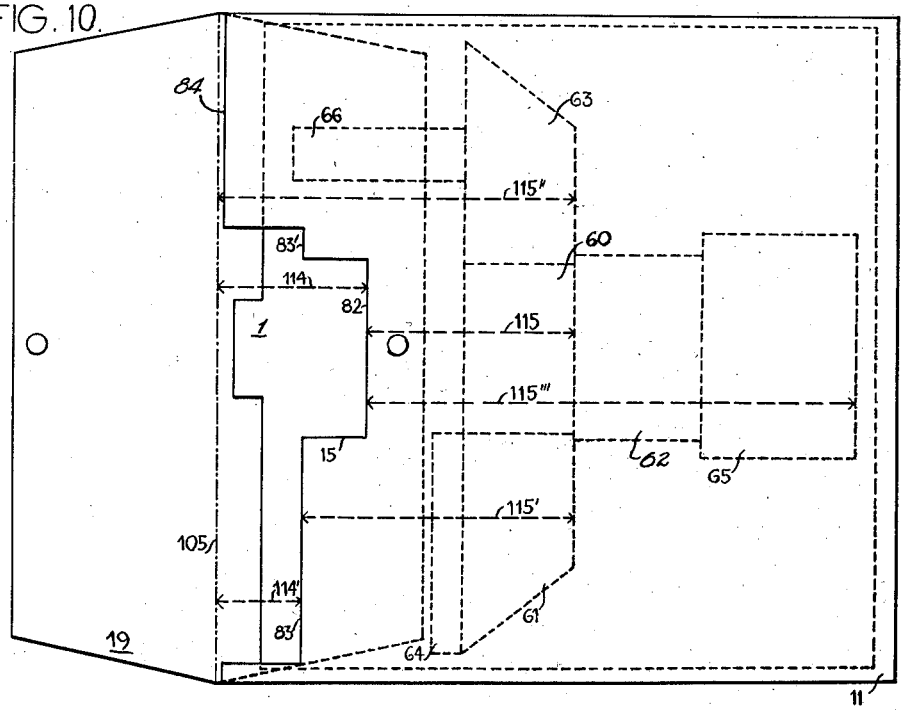
Figure 11:
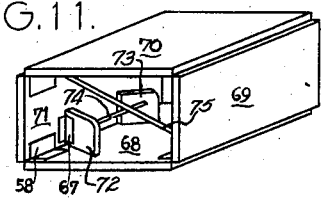
Figure 12:
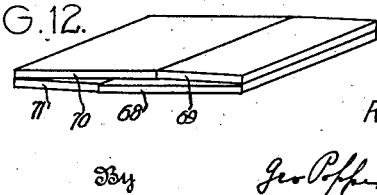

Figs. 9, 10, 11, 12 show another display device with parts whose operation is carefully timed; Fig. 9 showing a perspective view of the structure to be built up when in its display position, the position when folded being indicated in dotted lines, and Fig. 10 showing the envelope. Figs. 11 and 12 show in enlarged scale a detail in perspective view, in its unfolded and folded positions respectively.

Figs. 13, 14, 15 show a display device in which various parts are displayed one after the other and after a proper pause, one of the parts displayed subsequently covering up parts which were previously displayed. Fig. 13 shows a perspective view of the device in its display position, dotted lines indicating the folded position, while Fig. 14 shows the various phases of the movements of the parts. Fig. 15 shows the envelope used. The device enclosed in the envelope is shown in dotted lines.

Figure 1:
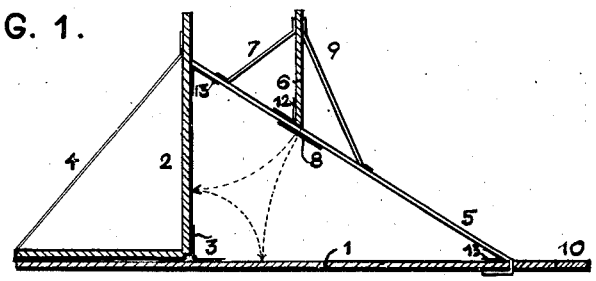
Figs. 1, 2, 3 illustrate a simple form of the invention.
Figure 2:
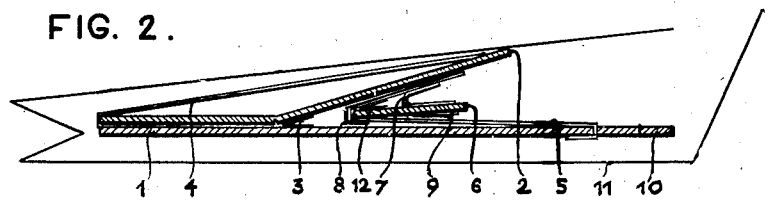
Figure 3:
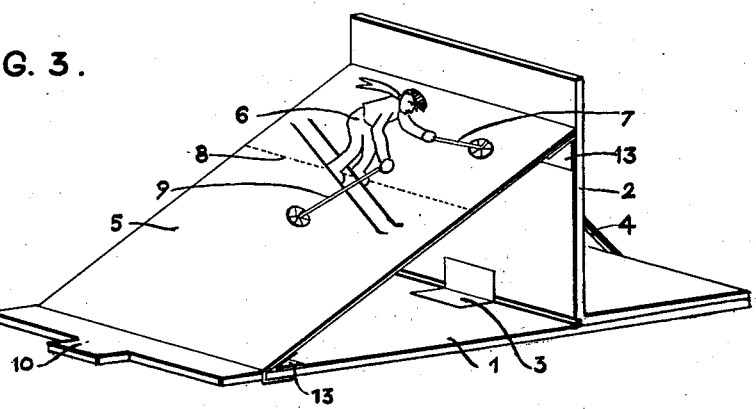

In the modification shown in Figs. 1, 2, and 3, the device according to my invention consists of the two sheets 1 and 2 capable of being folded which are hinged by means of a hinge 3 glued or cemented to the sheets. Connection of the parts may also be obtained by other means, such as projections of one sheet inserted into holes of the other, or by partly severing or cutting the sheet 2 along the line forming the axis of hinge 3 or by any other approved means. An elastic ribbon, a rubber band, or metallic spring 4 is attached to both sheets and tends to move sheet 2 to an upright position and beyond. The part 5 to be displayed is fixed to both sheets at some distance from hinge 3. Said part is made either of soft material or is also provided with a hinge 8 and two hinges 13 at the points of attachment to the sheets 1 and 2 respectively, so that it can be folded as clearly shown in Fig. 1 (dotted lines) and 2. This part 5 may e. g. consist itself of the sample to be displayed or may carry the part provided with the object, letter-press, or picture to be displayed. The parts 2 and 3 form one base carried unit actuated by a common propelling means 4. As shown in Figs. 1, 2, and 3, the main or display part 5 serves as a base for carrying a second unit 6 which is fastened to it by means of a hinge 12 and which is subjected to the pull of one, or more, elastic bands 7. This second unit is a flying unit; it is supported by a part moved toward a display position and it is operated by independent propelling means 7 which are attached to part 5 and become operative as soon as part 5 has moved to its display position. A stop 9 connected with part 5 may be provided which arrests the unit 6 in a predetermined position relative to said part. In the example shown the part 6 represents a person on skis, selected as the device to be displayed, said person seeming to glide down the part 5 which forms part of the picture, and using the two parts 7 and 9 as ski-poles.

Fig. 2 shows the parts in almost folded condition so that they are lying flat on each other's surface and can be inserted into an envelope 11 with only a tab 10 protruding or with a cut in the envelope allowing access to the tab 10. When the tab is pulled, the part 2 will be raised by the elastic means 4 as soon as the part 2 has cleared the envelope and the part 5 is thus stretched. It serves not only as a part of the display but also as a stop for part 2. The unfolding of part 5 frees part 6 which under the influence of the elastic means 7 is raised, the band 9 serving as a counterpart or stop. Pulling the device out of its envelope will thus automatically cause all the parts to assume the proper position for the desired display effect.

The device is also novel in this respect that it will display one of its parts (5) in a plane differing from the horizontal or vertical plane and will hold it in an inclined or intermediate position in itself most advantageous for a good display in many cases.

Figure 4:
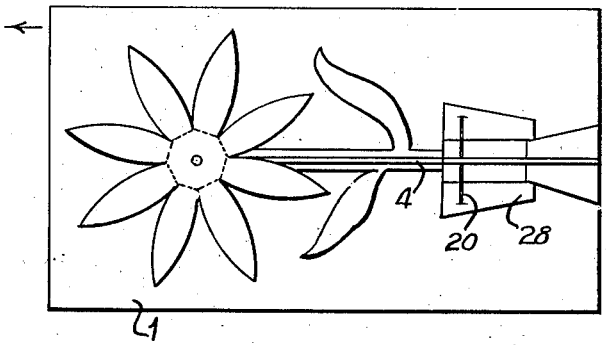
Fig. 4 shows a further modification with crossed elastic propelling means.

Fig. 4 illustrates a further improvement. When using the display device for certain purposes (greeting cards or the like) it is essential that the device should operate efficiently when first manipulated by a person (recipient) unfamiliar with its operation. When folding the device into its envelope, it frequently occurs that the elastic band 4 assumes a position in which the lever arm by means of which it has to raise the display part to which it is attached, disappears. The display unit then rises only if an additional impulse is given to it. This is especially true where long parts and long elastic bands have to be used which cause a perfect alignment eliminating the lever arm of the elastic force completely.

To ensure unfailing operation of an elastic band 4, said band is so arranged that it crosses a transverse elastic band and rests upon it. Said crossing band, when operating, raises itself above the level of the base sheet 1. Such an elastic band is shown at 20, attached to the two stops 28. This crossing band when attached between two movable parts 28 will always rise as its contraction causes rising of both points of attachment and this upward movement provides the initial impulse for the long band 4; at the same time a lever arm is created for the elastic force which causes operation of band 4.

Figs. 5, 6, 7, 8 illustrate another modification of the invention in which a structure is erected in three dimensions, the sequence of the steps involved being timed by virtue of a proper arrangement of the parts on the base 1. In the example shown, a building standing on the base plate 1 is erected, comprising four walls 36, 37, 38, 39 and a gabled roof 40 and 41. The two lateral parts 37 and 39 are combined parts consisting of two units each. One unit 37 and 39 respectively is carried by the base and is provided with the propelling means 48 which may be common to these units while hinged to these parts at 43 and 42 respectively parts 40 and 41 respectively are forming flying units supported by the movable parts 37 and 39. They are operated by a separate elastic propelling means 44 and 45 respectively. They form the roof when raised, and they assume an inclined position with respect to the lower (wall) parts 37 and 39 respectively. To present the appearance of a house the front part 36 and the lateral part 37 and 39 and 40, 41 respectively must contact and this is best secured by using the front part 36 as a stop for the said two lateral parts, and for the roof parts 40 and 41 respectively. Therefore the front part must be raised to its position first and this coordinated operation of the parts is accomplished by a suitable envelope. The latter is shown in Fig. 8, the folded display device being indicated in dotted lines. The releasing and timing edge 15 consists of three sections 101, 102, 103, located at varying distances 104, 104', 104'' from a transverse line 105 (drawn in dots and dashes) bordering on the slit, and also at varying distances from the edges of the display units which have to pass these sections during withdrawal. It is manifest that section 101 controls the rising of parts 39, 40, while section 102 controls parts 36 and 38, and section 103 controls parts 37 and 41. The central section 102 and the part 36 on the base sheet are arranged in such a way that when pulling the device out of its envelope 11, first the front part 36 will be freed. It will be drawn into an erect position by the elastic band or ribbon 46 and stopped by a stop 47 such as already described, in this position. Only after further pulling the device out of its envelope the two lateral parts 39, 40 and 37, 41 respectively are freed one after the other when passing the sections 103 and 101 of the releasing and timing edge 15 respectively and by virtue of the elastic band, ribbon or string 48 connecting them, are pulled into their upright position towards each other. When reaching the edges of the part 36 they are stopped in an upright position; the roof parts 40 and 41, actuated by the elastic bands 44 and 45 respectively, move further on their hinges 42 and 43 until they are stopped by the inclined portions of the front part 36 which represents the gable. The house is thus building itself up properly. The rear part 38 which is not immediately seen by the person manipulating the device, is freed only when the base plate 1 has almost left the envelope and it may simply be so arranged that upon being raised by the elastic ribbon 46, it will fill the opening that is left. It is therefore slightly smaller in every dimension than the front part 36. If the length of the elastic band 46 is properly chosen, part 38 may be hinged at 49 to the base 1 without a stop, being pulled only to an upright position and not further. This modification shows the coordinated operation of a plurality of base carried parts adapted to serve as stops for each other and for the flying units attached to the movable parts. By arranging the elastic bands 44, 45 which are fixed to the base sheet, in such a way that they rest on a transversal band 46 which automatically rises when operated, the operation of the remainder of the structure is ensured.

A further means for building up a structure by timed steps according to a predetermined order is illustrated in Figs. 9, 10, 11, 12, a fourwalled structure with a door and a slanting roof being shown as an example. The structure consists of three combined units 61, 62, 63 hinged to the base 1 and carrying flying units 64, 65, 66 attached to the first-named units, and of a central unit 60. The flying units in this case form a door frame or door stop 64 which is hinged at 76 to part 61, the elastic band 79 being the propelling means for this unit. The second flying unit forms the slanting roof 65 of the house and is hinged at 77 to unit 62. It is provided with the elastic means 80. The third unit, forming the door or door-bar 66 is hinged at 78 to part 63 and is actuated by the elastic band 81; the central unit 60 is separately illustrated in Figs. 11 and 12 on an enlarged scale, in its displayed and in its folded position respectively; it consists of four side parts 68, 69, 70, 71 and of stops 72 and 73. The four side parts are hinged to each other, one of said hinges being shown in 58. An elastic band or string 75 runs diagonally through the interior of the box-like structure and raises it to the position shown in Fig. 11. Pressure from above will fold it down until it assumes the position shown in Fig. 12. The stops 72 and 73 are hinged to part 71 at 67 and are preferably connected by an elastic band or string 74 drawing them to one another but leaving them in an inclined position with respect to part 71 as shown in Fig. 11. Any pressure on part 70 from above, bringing the structure into its folded position, will thus automatically return the stops into their folded position where they will lie flat on part 71. The elastic band 74, crossing the band 75 and rising automatically when operated, will lift band 75 and secure its operation as described in connection with bands 20 and 4 in Fig. 4. This central base carried unit 60 serves as a stop for the two side parts 61 and 63 which are drawn together by the elastic pull of the band or string 59 serving as a common propelling means for two base carried units facing each other. The central unit 60 must be raised first of all, then unit 61 with its flying unit, the door frame or door stop 64, must be brought into position to allow the door 66 (here only shown as a bar to illustrate the interior) to close on it. Units 63 and 66, the side wall with the door hinged to it at 78, should therefore be raised only after unit 61 with its attached flying unit 64 have been brought into an upright position. Finally the back wall 62 with the slanting roof 65 hinged to it at 77 can only be raised after both side walls are standing, as it uses them as a stop for the roof which may be firmly drawn against the wall parts to complete the structure. The elastic band which draws the unit 62 to its upright position has not been shown, however, in Fig. 9 to avoid confusion. In Fig. 9 the display position of all parts is shown in full lines, whereas in this figure and in Fig. 10 the folded position is indicated in dotted lines. The timed erection of all parts of the display device as above described is secured by the sections 82, 83, 83', 84 of the releasing and timing edge 15 of the envelope 11. These sections are again arranged at varying distances 114, 114' from the transverse line 105 (drawn in dots and dashes) which forms the ideal border of the slit of the envelope, and at varying distances 115, 115', 115" from the edges of the display units to be controlled. Section 82 whose distance 114 from the line 105 is the greatest, frees the central device 60 after the base sheet has been pulled over a stretch equal to distance 115. An advance equal to distance 115' frees display unit 61, 64 at section 83 and an advance equal to distance 115" causes section 84 to free unit 63, 66. Finally sections 83 and 83' free the last unit 62, 65 after the base has been drawn out of the envelope almost to its entirety (115'''), as shown in Fig. 10. A very simple structure erected in timed steps has been shown in this example but it is obvious that by providing cuts in the envelope any order or sequence in the uprising of parts may be obtained.

Figs. 13, 14, 15 illustrate another example of timed displaying of parts, the timing being in this case again obtained by the arrangement of the parts on the base. The parts 85 and 86 to be successively displayed contain e. g. two phases of a picture or two parts of a slogen or the like, which when juxtaposed form a complement to each other, or, when superimposed, obliterate the part previously displayed. In Fig. 13, a simple rectangle 85 is shown which is partly or totally covered by another rectangle 86 but obviously any form of sheets could be used provided only that the axis of the hinges (as 88, 90, and 92) are arranged in a proper manner and that the sheet 86 is wider than 85 to permit of the attachment of the elastic band 91 as described below. Fig. 14 diagrammatically shows the construction and operation of the device illustrating five phases of the operation marked I, II, III, IV, V. The device when enclosed in the envelope is shown in dotted lines in Fig. 15. The three parts 85, 86, 87 form three units which are operated separately; two of these units, namely 85 and 87, are carried by the base while the unit 86 is a flying unit. Each unit is provided with a separate propelling means, 89 and 93 respectively being the means operating the base carried units while elastic band 91 operates the flying unit. In the folded position, when in the envelope, as shown in Fig. 15 in dotted lines, the three parts 85, 86, and 87 are lying flat on the base 1, part 85 being hinged to base 1 at 88 in the fore part thereof, which is drawn out of the envelope first. Part 86 is hinged to part 87 at 90, part 87 being hinged to the base 1 at 92, at an appropriate distance from the hinge 88 of part 85, as shown in phase I. Fig. 13 shows how part 86 (and part 87 indicentally) is wider and longer than part 85, so that when 86 covers 85, a margin of parts 86 and 87 freely projects over part 85. The propelling means 91 for part 86 is arranged on this projecting margin and therefore the bands 91 can act without interference in every position of the parts. Fig. 15 shows the envelope 11 for this device with lateral sections 106, 106' coinciding with the border line 105 of the opening of the envelope while a central section 107 is cut out at a distance 117 from the line 105. This is done in order to have as long a pause as possible between the displaying of the parts 85 and 86. The central section 107 controls the former while the lateral sections 106 and 106' control the latter. When in the course of pulling the device out of the envelope, the hinge 88 has cleared section 107, display part 85 will be raised and drawn up by an elastic band or ribbon 89 to the position shown in phase II, and display its front part, carrying an appropriate picture or one part of the slogan, etc., to be displayed. It may be held in this position by a stop (not shown). Further pulling out of the base will not immediately release another part so that the picture or wording on part 85 is displayed for a certain time before the spectator. Only when the aft part of the base 1 is almost entirely pulled out, and clear of sections 106, 106' of the releasing and timing edge 15, the part 86 begins to move and is drawn towards part 87 by the elastic band or ribbon 91 attached to the margin of parts 86 and 87 as clearly shown in phase III. A stop (not shown) or simply the correct adjustment of the elastic ribbon limits the extent of movement of part 86 towards part 87 together with the proper adjustment of the hinge 90. Simultaneously, as shown in phase IV, the part 87 itself is drawn by means of an elastic band, ribbon or string 93 forward and part 86, which is at an angle to part 87, is drawn over part 85 which is thus covered completely, or, if part 86 is partly cut out, partly covered, said part 86 carrying the second part of the picture, or the second part of the slogan to be displayed, or the complementary part for the word or scene first displayed. The ultimate relation of the parts is shown in phase V of Fig. 14 and in Fig. 13 in solid lines. It is self-evident that a third element, etc., may be provided covering the second element, acting in a similar manner and displaying a third picture or another part of the slogan.

The devices described may be used for many purposes such as greeting cards, for publicity matter, displaying pictures or articles, for displaying samples or objects shipped to prospective customers, and shortly for any purpose where the displaying of objects in three dimensions is of advantage while folding to a flat package occupying substantially only two dimensions is necessary during other phases of use.

The invention is moreover not limited to the use of display devices as shown but comprises all kinds of devices with a plurality of units with coordinated automatic raising of parts when these are withdrawn from an envelope. It especially comprises devices building themselves up in all three dimensions of space in which building up is timed in such a way as to facilitate the erection of the structure displayed or as to obtain other effects associated with the nature of the contents of the display.

I claim:

1. In a display device of the character described, a base sheet and a foldable display arrangement mounted thereon, said arrangement consisting of a plurality of display members cooperating to build up the entire display arrangement, at least one of said members being hinged to the base sheet and at least one further member being hinged to base carried members, all display members assuming either a folded or a display position and each being provided with an operative edge which has to be uncovered to allow it to assume its display position, elastic propelling means attached to each of said display members, tensioned when said members assume their folded position, an envelope having a top and bottom sheet housing said base sheet and display arrangement, from which the base sheet is withdrawn to unfold the display arrangement and to bring its members into their display position, means for timing the display movement of the display members comprising a releasing and timing edge cut transversely into one of the sheets of the envelope, the sections of said edge under which the display members are passing during withdrawal being arranged at different distances from the operative edges of the display members, when the display device is housed in the envelope, said distances being so selected that the release of the display members and their movement to the display position is timed in a predetermined manner during withdrawal, the operative edges of the display members uncovered during withdrawal being arranged on the base sheet at predetermined different distances from a transverse line drawn perpendicularly to the direction of withdrawal through the foremost point of the base sheet.

2. In a display device of the character described, a base sheet and a foldable display arrangement mounted thereon, said arrangement consisting of a plurality of display members cooperating to build up the entire display arrangement, at least one of said members being hinged to the base sheet and at least one further member being hinged to base carried members, all display members assuming either a folded or a display position and each being provided with an operative edge which has to be uncovered to allow it to assume its display position, elastic propelling means attached to each of said display members, tensioned when said members assume their folded position, an envelope having a top and bottom sheet housing said base sheet and display arrangement from which the base sheet is withdrawn to unfold the display arrangement and to bring its members into their display position, means for timing the display movement of the display members comprising a releasing and timing edge cut transversely into one of the sheets of the envelope, the sections of said edge under which the display members are passing during withdrawal being arranged at different distances from the operative edges of the display members, when the display device is housed in the envelope, said distances being so selected that the release of the display members and their movement to the display position is timed in a predetermined manner during withdrawal, the releasing and timing edge consisting of a number of sections arranged along a broken line, parts of said broken line being spaced from each other in the direction of withdrawal of the display device from the envelope.

3. In a display device of the character described, a base sheet and a display arrangement mounted thereon, the latter consisting of a plurality of display members cooperating to build up the display arrangement, at least one of said members being hinged to base carried display members, all display members assuming either a folded or a display position and each being provided with an operative edge which has to be uncovered to allow the member to assume its display position, elastic propelling means attached to each of said display members which are tensioned when the members are in their folded position, an envelope having a top and bottom sheet housing the base sheet and display arrangement and holding the display members in their folded position, means for timing the display movement of the display members, comprising a releasing and timing edge transversely cut into one of the sheets of the envelope, an arrangement of said display members on the base sheet locating the operative edges of the former at predetermined distances from that section of the said releasing and timing edge which is passed by them during withdrawal of the base sheet from the envelope, and locating some display members in display positions in which they are intercepting other display members and are forming stops for them, the intercepting members being arranged with their operative edges at a shorter distance from the section of the releasing and timing edge which they pass during withdrawal than the operative edges of the display members whose movement is intercepted so that the first named members are released during an earlier phase of withdrawal than the last named members and are forming fixed stops for the latter when released.

4. A display device of the character described comprising a base sheet and a foldable display arrangement, the latter consisting of display members hinged to the base sheet and of at least one further display member hinged to a base carried display member, all display members assuming either a folded or a display position, elastic propelling means attached to each of said display members which are tensioned in their folded position, an arrangement of said display members on the base sheet comprising groups of display members spaced at a distance, with the display members of at least one of the groups so arranged that during their display movement they move towards another group, the distance between the two groups being less than the width of one of the display members of one of the two groups, an envelope consisting of a top and bottom sheet housing the base sheet and the display arrangement and keeping them in their folded position, means for timing the operation of the display members comprising a transversely cut releasing and timing edge, the groups of display members being released in successive phases during withdrawal, and the display position of one of the display members of one group released during a later phase of the withdrawal coinciding approximately with the display position of one of the members of the adjoining group released during an earlier phase of the withdrawal of the display arrangement with its base sheet from the envelope.

5. A display device comprising a base sheet and a foldable display arrangement mounted thereon, said arrangement consisting of at least one display member hinged to the base sheet and of at least one member hinged to base carried display members, all members assuming either a folded or a display position, at least one of the base carried display members being rigid and at least one display member being made of pliable material, the latter member being attached to the rigid member, the said pliable member folding upon itself when the rigid member assumes its folded position and being stretched when the rigid member assumes its display position, elastic propelling means attached to the rigid member and to the base sheet for moving said rigid member from the folded into the display position, at least one further rigid member hinged to the member made of pliable material, elastic means attached to said rigid member's free parts which are operative to bring it into its display position when the pliable member is stretched, the last named rigid member lying flat between the folds of the pliable member when the latter and the other rigid members are in their folded position, an envelope for housing the base sheet and the display arrangement, and means for releasing the display members under tension during withdrawal comprising a timing and releasing edge cut transversely into one of the sheets of the envelope.

6. A display device of the character described comprising a base sheet and a display arrangement mounted thereon, the latter consisting of display members assuming alternatively a folded and a display position, elastic propelling means attached to each of them, tensioned when the said members are in their folded position, an envelope consisting of a top and bottom sheet, means for timing the release of the display members comprising a releasing and timing edge cut transversely into one of the sheets of the envelope, the elastic propelling means of at least one display member when in its folded position crossing and resting upon the elastic propelling means of another display member the release of which precedes its own release, the operation of one display member thus assisting in securing the operation of another display member.

RAPHAEL C. POLLOCK.